Dec. 19, 1933.  S. C. CADDY ET AL  1,940,580
LIGHT REFLECTING LAMP
Filed June 16, 1933   3 Sheets-Sheet 2

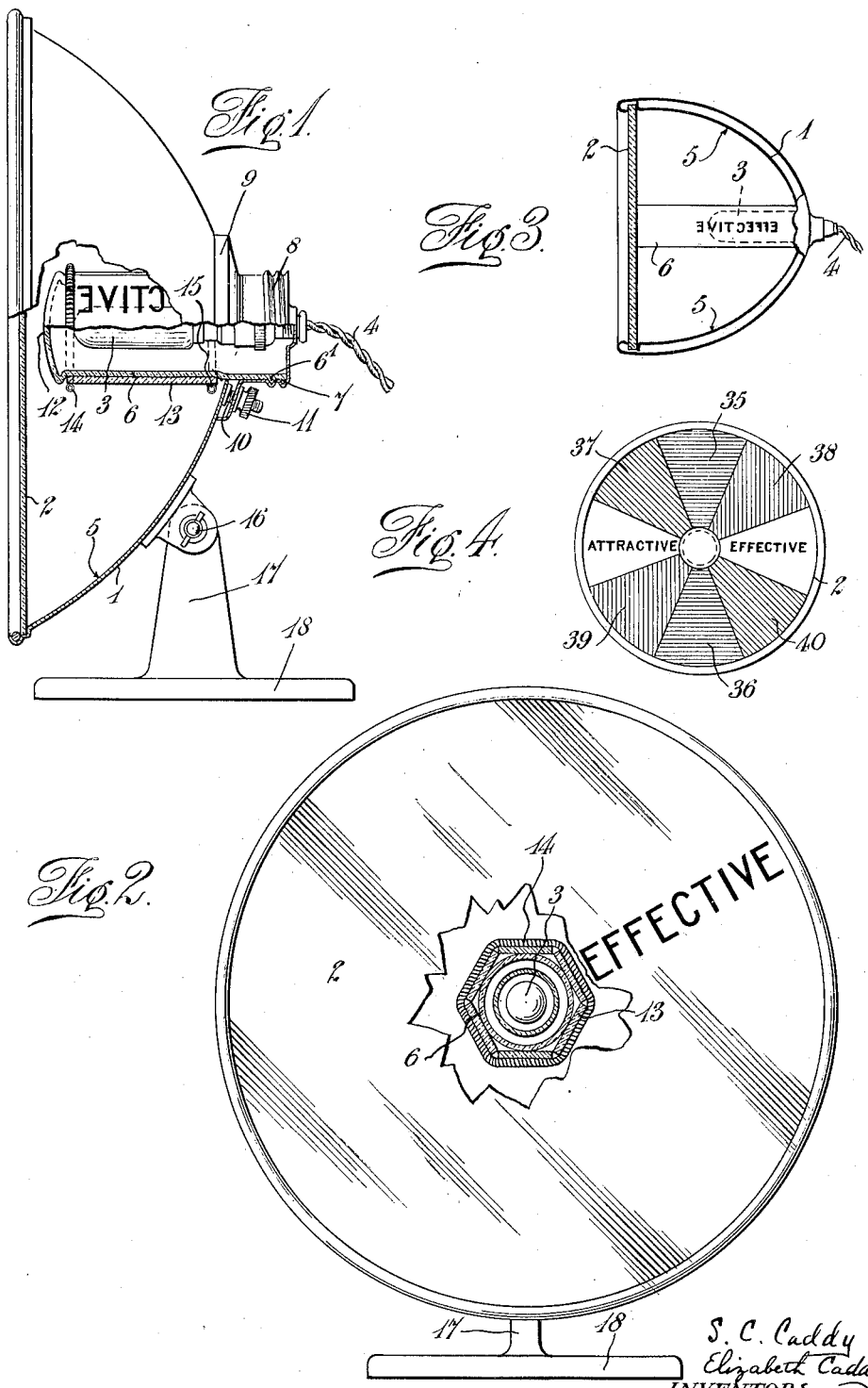

S.C. Caddy
Elizabeth Caddy
INVENTORS

BY Robert Robb
ATTORNEYS

Dec. 19, 1933.　　　S. C. CADDY ET AL　　　1,940,580
LIGHT REFLECTING LAMP
Filed June 16, 1933　　　3 Sheets-Sheet 3
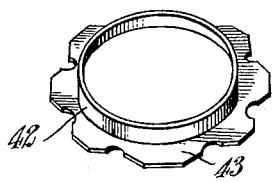
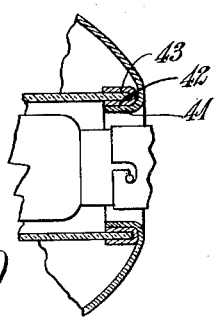
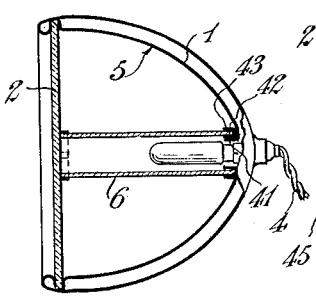
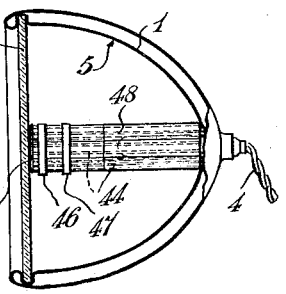
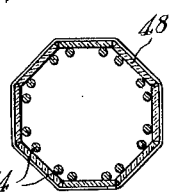
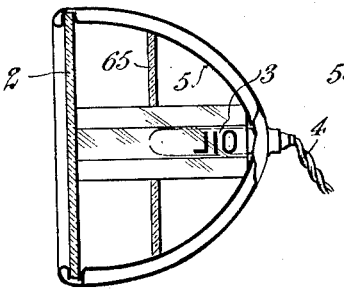
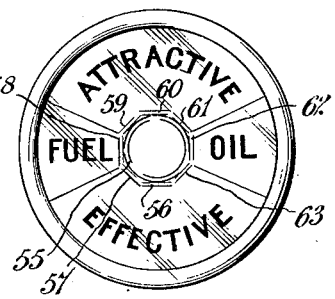
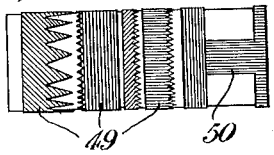
S. C. Caddy
Elizabeth Caddy
INVENTORS
BY Robb & Robb
ATTORNEYS Patented Dec. 19, 1933

1,940,580

UNITED STATES PATENT OFFICE 1,940,580

LIGHT REFLECTING LAMP

Sydney Charles Caddy and Elizabeth Caddy, Worthing, England

Application June 16, 1933, Serial No. 676,194, and in Great Britain August 11, 1931

9 Claims. (Cl. 40—131)

This invention relates to electric lamps of the reflector type and has for its object to provide an improved construction of electric incandescent lamp of the reflector type which is particularly adapted for use as an electric advertising lamp. The electric incandescent lamp hereinafter described and claimed is preferably of the type having a parabolic or other reflector. It has heretofore been proposed to provide a fixed or portable luminous advertising device in which the text, letter press or designs constituting the advertisement is arranged circularly and in reverse order around and directly on an electric incandescent bulb and concentric with the axis thereof or on to the peripheral surface of an opaline white or coloured sleeve or the like fitting round the base of the bulb where it is in contact with a parabolic elliptic or semi-spherical reflector of copper, brass polished white metal or silver glass of any dimensions suitable for displaying the desired advertisement. In such advertising device as aforesaid it has been proposed to form the text or drawings by cut out patterns of paper celluloid or other suitable materials glued or secured to the lamp or sleeve.

According to the present invention an electric incandescent lamp is provided wherein readable and/or pictorial advertising or other matter is mounted on permanent or removable and replaceable and/or interchangeable means surrounding the lamp bulb the letters or other elements forming the said advertising matter being so aligned that said matter is disposed parallel to the axis of the reflector and when rendered visible by reflection appears radially on the reflector when the lamp is lit with or without a coloured or multi-coloured appearance imparted to the reflector and/or to the matter rendered visible thereon. The uncoloured, coloured or multi-coloured appearance of the reflector may be accompanied by or combined with a mottled marled satinized or frosted appearance of the reflector and/or intermediate disc-like member or members imparted thereto by the aforesaid means. The appearance of the advertising or other matter on the lamp reflector may be produced over the whole or a part of the surface thereof and may appear radially reflected therefrom or radially and circularly reflected therefrom the latter appearance being obtained for example by circular alignment of the letters on successive parts of the means aforesaid and the colour effects may have the appearance of radially or radially and circumferentially arranged zones, segments, or sectors, or any desired combination thereof. It should be clearly understood however that any desired colour, multi-coloured, marled, mottled, satinized, frosted or other appearance or any desired combination of such appearances may be imparted to the lamp reflector by the means in accordance with the present invention.

In order that the invention may be clearly understood and readily carried into effect reference is made to the accompanying drawings which show diagrammatically and by way of example constructions of incandescent electric reflector lamps in accordance with the present invention.

Figure 1 is a part vertical section of an advertising incandescent lamp in accordance with the present invention.

Figure 2 partly in section is a front view thereof.

Figure 3 is a vertical section through the axis of an advertising incandescent electric reflector lamp in accordance with the present invention.

Figure 4 is a front elevation of Figure 3.

Figure 16 is a vertical axial section of a further modified form of incandescent electric reflector lamp in accordance with the present invention.

Figure 17 is a perspective view of a clip hereinafter described.

Figure 18 is an enlarged section showing how the tubular member is supported by the reflector.

Figure 19 is a sectional side elevation showing a skeleton frame for use in supporting rings or strips of transparent material required to impart the necessary appearance to the reflector.

Figure 20 is a cross section of the skeleton frame shown in Figure 19.

Figure 21 is a vertical axial section of a further modified form of incandescent electric reflector lamp in accordance with the present invention for use for advertising purposes.

Figure 22 is a front elevation of Figure 21.

Figure 23 is a side elevation of a tubular member showing slip-on transparent coloured rings or sleeves and coloured strips thereon.

Figure 5:
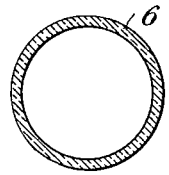
Figures 5 and 6 show respectively a circular section of a tubular member hereinafter described and a tubular member of oval section the said tubular member being adapted to project readable or visible advertising matter on the reflector.
Figure 6:
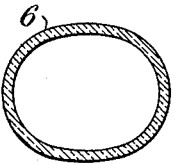
Figure 11:
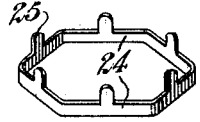
Figure 11 is a perspective of a clip hereinafter described.
Figure 7:
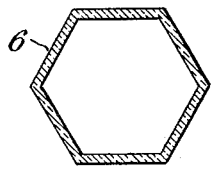
Figures 7 and 8 are respectively a cross section and a side elevation of a tubular member in accordance with the present invention.
Figure 8:
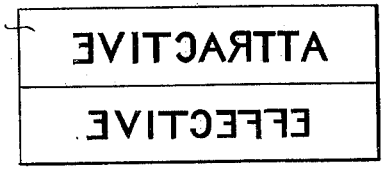
Figure 9:
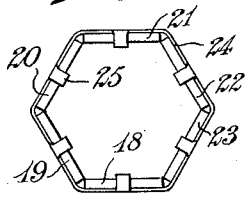
Figure 9 is an end view of a built up tubular member also in accordance with the present invention and Figure 10 is a side elevation of Figure 9.
Figure 10:
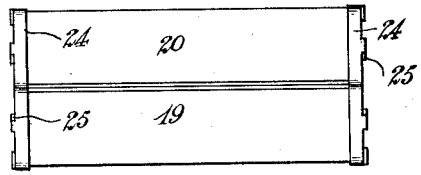
Figure 12:
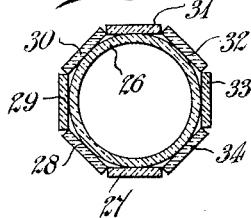
Figures 12 and 13 are respectively a cross section and a side elevation of a further form of built up tubular member.
Figure 13:
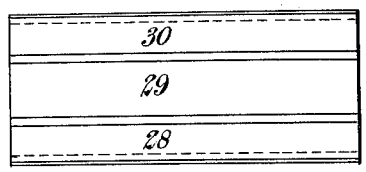
Figure 14:
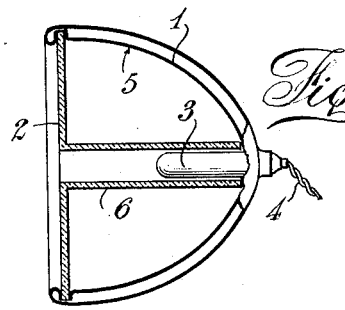
Figure 14 is a vertical axial section of an incandescent electric lamp in accordance with the present invention showing the tubular member as being formed in one with the lamp glass.
Figure 15:
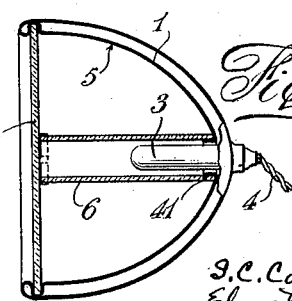
Figure 15 is a vertical section of an incandescent electric reflector lamp showing the tubular member as being supported by the reflector of the lamp.

Referring to Figures 1, 2, 3, and 4 of the accompanying drawings an incandescent electric lamp is as heretofore provided with a reflector 1 and a front glass 2 hereinafter referred to as the lamp glass. 3 is a tubular bulb or it may be a bulb of any ordinary and suitable type. 4 are the electric leads to the filament in the bulb 3. It is preferred but not essential that the reflector 1 be of the parabolic type but the said reflector may be of any other suitable type and is provided on its inner surface 5 with a highly polished surface. In the interior of the lamp is an inwardly projecting hollow member 6 of a wholly or partly transparent and/or translucent or partly opaque nature. The tubular member 6 forms a sleeve and is provided with a rearward extension 6' of a larger diameter than the sleeve 6 and also an external screw thread 7 which is engageable by a closing cap 8. The cap 8 is provided with a circular annular flange 9 adapted to be retained in position on the rear of the reflector by screws 10 rigidly secured to the reflector casing 1 and nuts 11. The forward end of the sleeve is closed as at 12 and shouldered and on the sleeve are mounted a plurality of glass panels or strips 13 these glass panels or strips being coloured or multi-coloured and held in position on the sleeve 6 by helical circular springs 14 and 15. The reflector casing is pivotally mounted as at 16 on a standard 17 having a base plate 18. The tubular member 6 may however as shown in Figure 3 be loosely supported between the lamp glass 2 and the inner surface 5 of the reflector 1. It may however as hereinafter described be formed integral with the lamp glass 2 as shown in Figure 14 or it may be supported by suitable rings or clips by the reflector itself as shown in Figures 15 and 16 hereinafter described. As shown in Figure 5 the tubular member 6 may be hollow and cylindrical or of hollow oval form as shown in Figure 6. As shown in Figures 7 and 8 the tubular member 6 is of hollow polygonal form such as hexagonal and is made in one piece. The tubular member 6 of whatever form bears readable or pictorial or other desired advertising matter with or without a coloured or multi-coloured appearance. In Figures 9 and 10 the hollow tubular member 6 is built up of a plurality of strips 18, 19, 20, 21, 22 and 23 of transparent translucent, marled, mottled, frosted, satinized and/or coloured, multi-coloured or partly opaque material or any desired combination thereof. It should be clearly understood however that there may be any suitable number of strips of transparent or partly opaque material other than that shown in Figure 9 and that the cross sectional form of the tubular member 6 may be a combination of any of the aforesaid cross sectional forms. These strips 18, 19, 20, 21, 22 and 23 may be secured or held in position by adhesive or they may be loosely mounted on the tubular member 6 and held in place by wire clips 24 having projecting tongues 25 as shown in Figures 9, 10 and 11 the said clips being disposed one at each end of the strips and surrounding the said strips and of a similar shape thereto. In Figures 12 and 13 the tubular member 6 is shown as being formed as an inner tube 26 of transparent material such as glass on which are superimposed eight strips 27, 28, 29, 30, 31, 32, 33 and 34 of transparent or partly opaque material. The inner or outer surface of the tube 26 or strips may be mottled, marled, satinized or frosted and uncoloured or coloured or multi-coloured by the application of transparent coloured material or coloured medium thereto or the colouring medium may be incorporated in the strips. One or more than one strip may however be formed of coloured glass or a sheet of coloured glass may be superimposed and suitably secured to a sheet of plain glass to obtain the desired colour effect.

The tubular member 6 in all of the aforesaid constructions is provided on its outer surface with advertising or other readable or pictorial matter such for example as the words "attractive", "effective" as shown in Figures 1, 3 and 4, Figures 2 and 4 showing the appearance of the words on the reflector when the lamp is lit. The remaining part of the tubular member 6 may, as shown in Figure 4 be so formed as to produce apparently frosted surfaces 35, 36 and coloured surfaces 37, 38, 39 and 40 on the reflector, any desired colour being obtained by the superimposition on the tubular member 6 of interchangeable and/or replaceable strips of frosted transparent material and/or transparent coloured or multi-coloured material. Instead of obtaining the coloured or coloured and frosted appearance indicated in Figure 4 by the use of transparent strips applied to the external or internal surface of the tubular member 6 the latter may, whatever its form, be coated with a transparent, frosted and/or colouring medium to give the same effect or the said tubular member 6 may have the colouring matter or material or medium incorporated therein during the course of manufacture.

In Figures 7 and 8 the sides of the hexagonal tubular member there shown may be marled, mottled, frosted, satinized and/or coloured or multi-coloured by coating, spraying or by the application thereto of strips of marled, mottled, frosted, satinized coloured or multi-coloured transparent material secured thereto as by adhesive. A suitable material for such purpose is celluloid both in its inflammable and non-inflammable form or any other transparent material of a like nature. In the construction of tubular member 6 shown in Figures 9 and 10 the strips 18, 19, 20 etc. are removable, replaceable and interchangeable and any one or more than one of these strips is provided with advertising matter on its inner or outer surface. Such advertising matter is of a readable, pictorial or combined readable and pictorial or other desired form. In the construction of tubular member shown in Figures 12 and 13 the strips 27, 28, 29, 30, 31, 32, 33 and 34 when loosely supported on the tube 26 are removable, replaceable, renewable and interchangeable and any one or more than one strip of such strips bears advertising matter of any suitable or desired nature on its inner or outer surface. Further where strips are used they may be so arranged as to slide on and into position on the tube 26 which may be formed with guide ridges. In Figure 14 the tubular member 6 which is of a blue or other colour and/or marled mottled or frosted throughout its length or only for a part thereof is shown as being formed in one with the lamp glass 2 but it should be clearly understood that the desired effect on the inner surface 5 of the reflector 1 may be produced in accordance with the construction of the tubular member 6 shown and described with reference to Figures 3, 5, 6, 7, 9, 12, 15 and 16. In Figure 15 the tubular member 6 although shown as being of cylindrical form may be of any of the forms shown in Figures 6, 7, 9, 12, 20 and 21. In such arrangement the rear end of the tubular member 6 is centred on a ring 41 stamped up or spun inwardly or provided as a separate fitment attachable to the reflector 1. Such an arrangement is more particularly intended for use with a circular, oval, polygonal or other non-rectangular form of tubular member in cross section. Where however the tubular member is of the built up form such as shown in Figures 9, 10, 12 and 13 the rear end of the built up member is centred on a ring 42 having protecting tongues 43 as shown in Figures 16, 17 and 18. The ring 43 fits on to a ring such as 41 corresponding to the ring 41 in Figure 15 which as previously stated may be formed in one with the reflector 1 or may be provided as a separate and attachable fitment thereto. In the construction shown in Figure 16 the tongues 43 are bent over on to the strips (see Figure 18) forming the tubular member 6 so as to hold the said strips in position. If desired a polygonal frame similar to the frame 24 may be mounted round the strips at the front end thereof. It will be obvious from the foregoing description that the tubular member 6 or the parts thereof can be removed from the interior of the lamp when desired. In Figure 19 the tubular member is replaced or substituted by a framework composed of a plurality of longitudinally arranged wires 44 or glass or transparent rods of celluloid or the like soldered or otherwise secured to the reflector 1. The said skeleton framework may be tied at its outer end by a wire 45 or wire clips such as 24 or other suitable means and also if desired at places intermediate of the wire 45 and the reflector 1. Transparent frosted, coloured or multi-coloured rings such as 46, 47 or strips 48 may be superimposed on the framework to give the desired effect on the reflecting surface 5 of the lamp reflector. In the circular form of tubular member 6 as shown in Figures 3, 5, 14, 15, 16, 18 and 23 and the oval form shown in Figure 6 as well as in the form shown in Figures 7 and 8 and the built up form shown in Figures 9, 10, 11 and 12, rings 49 of marled, mottled, frosted, satinized, self-coloured or multi-coloured appearance may be used either alone or in combination with strips 50 Figure 23 of coloured or uncoloured appearance.

In the advertising form of lamp shown in Figures 21 and 22 the tubular member may be of circular polygonal or other desired form in cross section or it may be of the form shown in Figures 1, 2, 3, 4, 9 and 10 or of the form shown in Figures 12 and 13 or other desired and suitable form. A suitable cross section however of the tubular member 6 for advertising purposes is the circular form shown in Figures 1, 2, 3 and 5 or the form shown in Figures 12 and 13. In whatever form the outer surface of the tubular member as shown in Figure 23 may be provided with a plurality of rings such as 49 of transparent, coloured or frosted material which can be slipped on to the tubular member 6 and replaced by other forms of rings when desired. A more convenient form however is that in which the tubular member comprises an inner tube 55 of clear coloured or multi-coloured plain or mottled or marled glass or frosted or satinized glass on which are preferably loosely superimposed a plurality of strips 56, 57, 58, 59, 60, 61, 62 and 63. These strips of glass or other suitable transparent material may be self coloured as well as being frosted, marled, mottled, satinized or they may be only self coloured. They must however be transparent so as to permit of the light passing therethrough and the tube 55 together with the said strips may be rendered rigid with the lamp glass 2 by adhesive or by helical circular springs as shown in Figures 1 and 2 or by the construction and arrangement described with reference to the rings 41 and 42 in Figures 15, 16 and 17. One or more than one strip is provided with advertising matter suitably applied thereto and if desired and in order to enhance the advertising effect one or more than one disc 65 or part disc may be superposed around the strips 57, 58, 59 etc. the said disc 65 being clear, transparent, frosted, coloured, multi-coloured, mottled, marled, satinized or treated in any other desired way to enhance the nature of the advertisement as reflected by projection from the lamp reflector. For example the surface of the said disc may be sand blasted or painted as by coating or spraying with material which is either transparent or adapted to give the desired effect. Again any advertising matter such as readable and/or pictorial matter may be applied to the said disc as well as to the strips by a transparent medium of any desired colour. The bulb and sleeve whether the latter be of an integral or built up nature may be removable and replaceable in the lamp casing as a single unit. The colouring of the tubular member panels, strips or rings either wholly or in part may be obtained by wrapping a piece or pieces of transparent material of the desired colour or colours round the said tubular member, panels, strips or rings.

An electric incandescent lamp such as hereinbefore described with reference to the accompanying drawings may be used for advertising and/or signalling purposes provided the interior of the lamp be illuminated by interior lighting or by direct light as from another light source of suitable power impinging on the lamp front.

What we claim is:—

1. In an illuminated sign the combination with a source of light and a concave reflector, of a sleeve composed of panels concentrically surrounding the source of light and having display elements arranged lengthwise thereon in order to obtain a reflection of the said elements radially on the reflector.

2. In an illuminated sign the combination with a source of light and a concave reflector, of a plurality of strips of transparent material assembled to form a sleeve disposed concentrically with the axes of the source of light and the reflector and surrounding the source of light and display elements forming advertising matter aligned lengthwise of and on the said strips and disposed thereon parallel to the axis of the reflector.

3. An illuminated sign comprising a source of light, a reflector associated therewith, a transparent sleeve concentrically arranged relatively to the axes of the source of light and the reflector and surrounding the light, a plurality of removable and replaceable transparent strips mounted on and arranged around the peripheral surface of the said sleeve and display elements disposed lengthwise on and of the said strips in order to obtain radial reflection on the reflector of the elements on the said strips.

4. An illuminated sign comprising a source of light, a reflector associated therewith, a transparent sleeve concentrically arranged relatively to the axes of the source of light and the reflector and surrounding the light and a plurality of interchangeable and intermixed clear and colored transparent strips mounted on the said sleeve and bearing on their peripheral surfaces a plurality of lengthwise aligned display elements in order to obtain radial reflection of the said elements on the reflector.

5. An illuminated sign comprising a reflector, a source of light disposed centrally thereof, an integral sleeve concentrically arranged relatively to and surrounding the said light, a further sleeve formed of a plurality of intermixed clear and colored strips of transparent material mounted on and surrounding the integral sleeve, a transparent disc having an opening of the same contour as the peripheral contour of the assembled strips, a plurality of display elements arranged circularly on the said disc and a plurality of characters arranged in lengthwise alignment on the said strips in order to obtain radial reflection thereof on the reflector.

6. An illuminated sign comprising a source of light, a reflector surrounding the same, a sleeve concentrically surrounding the light, and a disc mounted on said sleeve, the sleeve bearing matter arranged to be reflected in a radial arrangement on the reflector while the disc bears matter displayed in a circular arrangement.

7. An illuminated sign comprising a source of light, a reflector surrounding the same, a sleeve concentrically surrounding the light and bearing character elements arranged lengthwise thereof, and a disc mounted on said sleeve and bearing character elements arranged circularly thereof, said sleeve elements being reflected radially on the reflector.

8. An illuminated sign comprising a source of light, a reflector surrounding the same, and a series of members surrounding the light, certain of said members being constructed to give design effects and others having character elements arranged lengthwise so as to be reflected radially upon the reflector.

9. In an illuminated sign, the combination with a source of light and a reflector, of a plurality of strips disposed about said light in the form of a sleeve, and ring members having elements engaging the respective strips to hold them in the sleeve-like form, certain of said strips bearing matter extending lengthwise so as to be reflected in a radial arrangement on the reflector.

SYDNEY CHARLES CADDY.
ELIZABETH CADDY.